United States Patent
Davlos et al.

(10) Patent No.: US 11,243,985 B1
(45) Date of Patent: Feb. 8, 2022

(54) SYSTEM AND METHOD FOR NAME ENTITY DISAMBIGUATION WITH LATENT TOPIC AND DEEP GRAPH ANALYSIS

(71) Applicant: Innoplexus AG, Eschborn (DE)

(72) Inventors: Stratos Davlos, Sausalito, CA (US); Lavanya Kannan, Fair Lawn, NJ (US); Ashwin Rathod, Nanded (IN)

(73) Assignee: Innoplexus AG, Eschborn (DE)

( * ) Notice: Subject to any disclaimer, the term of this patent is extended or adjusted under 35 U.S.C. 154(b) by 19 days.

(21) Appl. No.: 16/931,540

(22) Filed: Jul. 17, 2020

(51) Int. Cl.
*G06F 16/28* (2019.01)
*G06N 20/00* (2019.01)
*G06F 16/93* (2019.01)

(52) U.S. Cl.
CPC .......... *G06F 16/285* (2019.01); *G06F 16/288* (2019.01); *G06F 16/93* (2019.01); *G06N 20/00* (2019.01)

(58) Field of Classification Search
CPC .............................. G06N 20/00; G06F 16/288
See application file for complete search history.

(56) References Cited

U.S. PATENT DOCUMENTS

2017/0004199 A1* 1/2017 Hausler ............... G06F 16/2228
2018/0068406 A1* 3/2018 Van De Sande ... G06Q 30/0201

* cited by examiner

*Primary Examiner* — Hau H Hoang
(74) *Attorney, Agent, or Firm* — Ziegler IP Law Group, LLC

(57) ABSTRACT

A system for entity disambiguation. The system includes a server arrangement communicably coupled to a database arrangement including a plurality of documents. The server arrangement is configured to generate an entity network by parsing the plurality of documents, determining latent features relating to the plurality of documents and identifying relationships between the latent features and at least one document entity; determine importance score of each of the name entities using centrality algorithms; determine a relevance score of at least one document entity using link analysis algorithms; cluster the name entities based on the relationships therebetween using clustering coefficients; assign a name entity from each cluster of name entities as the person entity; and employ contextual information determined for the entity network to be used in a mathematical model for entity disambiguation.

15 Claims, 3 Drawing Sheets

SYSTEM AND METHOD FOR NAME ENTITY DISAMBIGUATION WITH LATENT TOPIC AND DEEP GRAPH ANALYSIS

TECHNICAL FIELD

The present disclosure relates generally to data processing and analytics, and more specifically, to systems and methods for name entity disambiguation with latent topic and deep graph analysis.

BACKGROUND

In recent times, technology has played a vital role in rapid developments across a multitude of industries. Generally, with an increasing amount of research and innovation; the amount of unstructured information or documents related to entities such as persons, organizations and so forth becomes colossal. Consequently, retrieval of relevant accurate information relating to such entities from the pool of documents becomes a troublesome task, for example, for retrieving information about a person named Deb Jain, that may include, one or more names such as Debashish Jain, D Jain, or DJ. Similarly, there could exist one or more persons having the name Deb Jain. Therefore, there exists a significant need to disambiguate information relating to entities in existing documents.

Conventionally, the named entities are identified and classified using co-relations between existing names, citations and relationships by employing data mining and data scraping methods pre-existing in the art to significantly reduce the existing problem. However, conventional systems fail to provide reliable means to perform the given task of entity disambiguation primarily due to entity recognition errors, ambiguous references, multiple duplicate entities and entities citing multiple or no references.

Generally, documents are stored as a large collection of objects. Over a period of time, an exponential increase in the number of documents published and/or stored across various platforms often in one or more forms, concerning a singular subject and/or topic has developed a bottleneck for relevant entity extraction, retrieval and mining. For example, documents comprising of multiple objects representing the same entity, referred to as a duplicate entity greatly affects the computational performance.

Furthermore, the conventional approaches provide limited operational efficiency. Said approaches are effective for a few objects having a particular or singular type. Furthermore, conventional approaches are rendered ineffective when the entities include incomplete, redundant or ambiguous information. For example, text normalization of documents having multiple entity types is difficult to execute and cumbersome. Additionally, existing text mining tools do not include any provisions for over-lapping entities information.

Therefore, in light of the foregoing discussion, there exists a need to overcome the aforementioned drawbacks associated with the method for entity disambiguation.

SUMMARY

The present disclosure seeks to provide a system for entity disambiguation. The present disclosure also seeks to provide a method of entity disambiguation. The present disclosure seeks to provide a solution to the existing problem of unmanageable, unstructured, time consuming and inefficient techniques of entity disambiguation. An aim of the present disclosure is to provide a solution that overcomes at least partially the problems encountered in prior art, and provides processing and time-efficient method of entity disambiguation.

In one aspect, the present disclosure provides a system for entity disambiguation, the system comprising a server arrangement communicably coupled to a database arrangement comprising a plurality of documents, wherein the server arrangement is configured to:

generate an entity network by parsing the plurality of documents, wherein the entity network comprises a plurality of entities and their relationships, the plurality of entities comprising at least: documents entities, name entities and topic entities, wherein the entity network is generated by:
  determining latent features relating to the plurality of documents and identifying relationships between the latent features and at least one document entity;
  determine an importance score of each of the name entities using centrality algorithms;
  determine a relevance score of at least one document entity based on relationships thereof with the name entities and the topic entities, and the importance scores of each of the name entities using link analysis algorithms;
  cluster one or more name entities based on the relationships therebetween using clustering coefficients;
  assign a name entity from each cluster of the one or more name entities as the person entity based on the importance score of each of the name entities; and
  employ contextual information determined for the entity network to be used in a mathematical model for entity disambiguation.

In another aspect, the present disclosure provides a method for entity disambiguation, wherein the method is implemented using a system comprising a server arrangement communicably coupled to a database arrangement, wherein the database arrangement comprises a plurality of documents, wherein the method comprises:

generating an entity network by parsing the plurality of documents, wherein the entity network comprises a plurality of entities and their relationships, the plurality of entities comprising at least: document entities, name entities and topic entities, wherein the entity network is generated by:
  determining latent features relating to the plurality of documents and identifying relationships between the latent features and at least one document entity;
  determining an importance score of each of the name entities using centrality algorithms;
  determining a relevance score of at least one document entity based on relationships thereof with the name entities and the topic entities, and the importance score of each of the name entities using link analysis algorithms;
  clustering one or more name entities based on the relationships therebetween using clustering coefficients;
  assigning a name entity from each cluster of the one or more name entities as the person entity based on the importance score of each of the name entities; and
  employing contextual information determined for the entity network to be used in a mathematical model for entity disambiguation.

Embodiments of the present disclosure substantially eliminate or at least partially address the aforementioned problems in the prior art, and provides a manageable and efficient method of entity disambiguation.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
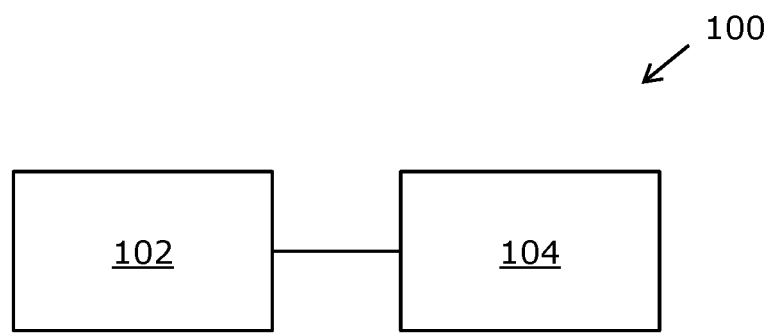
FIG. 1 is an illustration of a network environment in which a system for entity disambiguation is implemented, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, the present disclosure provides a system for entity disambiguation, the system comprising a server arrangement communicably coupled to a database arrangement comprising a plurality of documents, wherein the server arrangement is configured to:
generate an entity network by parsing the plurality of documents, wherein the entity network comprises a plurality of entities and their relationships, the plurality of entities comprising at least: document entities, name entities and topic entities, wherein the entity network is generated by:
determining latent features relating to the plurality of documents and identifying relationships between the latent features and at least one document entity;
determine an importance score of each of the name entities using centrality algorithms;
determine a relevance score of at least one document entity based on relationships thereof with the name entities and the topic entities, and the importance score of each of the name entities using link analysis algorithms;
cluster one or more name entities based on the relationships therebetween using clustering coefficients;
assign a name entity from each cluster of the one or more name entities as the person entity based on the importance score of each of the name entities; and
employ contextual information determined for the entity network to be used in a mathematical model for entity disambiguation.

In another aspect, the present disclosure provides a method for entity disambiguation, wherein the method is implemented using a system comprising a server arrangement communicably coupled to a database arrangement, wherein the database arrangement comprises a plurality of documents, wherein the method comprises:
generating an entity network by parsing the plurality of documents, wherein the entity network comprises a plurality of entities and their relationships, the plurality of entities comprising at least: documents entities, name entities and topic entities, wherein the entity network is generated by:
determining latent features relating to the plurality of documents and identifying relationships between the latent features and at least one document entity;
determining an importance score of each of the name entities using centrality algorithms;
determining a relevance score of at least one document entity based on relationships thereof with the name entities and the topic entities, and the importance scores of each of the name entities using link analysis algorithms;
clustering one or more name entities based on the relationships therebetween using clustering coefficients;
assigning a name entity from each cluster of the one or more name entities as the person entity based on the importance score of each of the name entities; and
employing contextual information determined for the entity network to be used in a mathematical model for entity disambiguation.

The present disclosure provides a system and method of entity disambiguation that is efficient in terms of time and processing power required for use thereof. The system and method of the present disclosure enable disambiguation of information relating to entities (namely, person entities, organization entities and the like), thereby allowing an increased amount of information to be available for a given entity. Furthermore, the system significantly reduces entity recognition errors, ambiguous references. The system described herein de-duplicates repetitive information belonging to the same entity, thereby significantly reducing sizes of datasets and processing power required for processing thereof. Additionally, the method described herein does not require human intervention for functioning thereof. Furthermore, the method exhibits a very low computational (namely, processing) and time complexity.

The present disclosure relates to a system for entity disambiguation, wherein entities are extracted from a plurality of documents. Notably, the plurality of documents comprise information relating to the entities (namely, person entities, organization entities and the like) therein. It will be appreciated that the documents may comprise repetitive information for a given entity or may comprise a given entity with different names. Therefore, the present disclosure seeks to provide a solution to such ambiguity and aims to identify different names that may refer to a singular person.

The system comprises a server arrangement. Herein, the term "server arrangement" refers to a structure and/or module that include programmable and/or non-programmable components configured to store, process and/or share information. Optionally, the server arrangement includes any arrangement of physical or virtual computational entities capable of enhancing information to perform various computational tasks. Furthermore, it should be appreciated that the server may be both single hardware server and/or plurality of hardware servers operating in a parallel or distributed architecture. In an example, the server may include components such as memory, a processor, a network adapter and the like, to store, process and/or share information with other computing components, such as user device/user equipment. Optionally, the server is implemented as a computer program that provides various services (such as database service) to other devices, modules or apparatus.

The server arrangement is communicably coupled to a database arrangement. Herein, the term "database arrangement" refers to an organized body of digital information, regardless of the manner in which the data or the organized body thereof is represented. Optionally, the database may be hardware, software, firmware and/or any combination thereof. For example, the organized body of related data may be in the form of a table, a map, a grid, a packet, a datagram, a file, a document, a list or in any other form. The database includes any data storage software and systems, such as, for example, a relational database like IBM DB2 and Oracle 9.

The database arrangement stores a plurality of documents. Herein, the term "documents" refers to electronic documents comprising information stored in a digital format. Notably, the information is recorded as a data type. Some examples of various data types are text data, tabular data, image data, and so forth. Thus, documents may be in any suitable file formats depending upon the data type in which the information is recorded. The document may be a research paper, a technical publication, a clinical trial, a study result, medical journals, patent documents and the like. Notably, the plurality of documents may be domain specific.

The server arrangement is configured to generate an entity network by parsing the plurality of documents, wherein the entity network comprises a plurality of entities and their relationships, the plurality of entities comprising at least: document entities, name entities and topic entities. Herein, the term "entity" refers to an attribute of a document that provides characteristic information about the document. Examples of such characteristic information may include, but is not limited to, name of an author of the document, names of persons mentioned in the document, a unique identifier of the document, a topic to which the document belongs, content of the document, title of the document, publication organization from where the document originated, location of the publication organization. Therefore, attributes representing such characteristic information are extracted from the plurality of documents by parsing thereof and included in the entity network as entities. Specifically, parsing refers to analyzing a document and determining syntactic roles of the content in the document using syntax analysis. Such syntactic analysis provides segregation of content in the document based on content type (such as noun, proper noun, verb, adjective) and allow isolation of key information from the document. Furthermore, the server arrangement may parse metadata related to the document. Specifically, the metadata related to the document comprises tabulated information that is principal to the document.

Optionally, extracting entities from the documents comprises cleaning and/or translating the documents. Specifically, cleaning the documents refers to removal of unnecessary comments, annotations, symbols, images and/or a combination thereof. Consequently, the server arrangement extracts only relevant information from the existing data sources. Moreover, translating the documents refers to conversion thereof to a machine-readable form. Beneficially, cleaning and/or translating the documents reduce processing complexity thereof. Additionally, cleaning and/or translating the documents also reduce processing time for identifying information relating to the entity. Optionally, a dedicated and adaptive subroutine may extract the information relating to the entities.

The plurality of entities comprising at least: documents entities, name entities and topic entities. Notably, the plurality of entities identified from a given document comprise entities representing different characteristic information related to the given document. Firstly, the document is included as document entities in the entity network. Optionally, any relating document that a given document refers to may also be included as documents entities in the entity network. Thereafter, name entities for the documents are identified. Specifically, a name entity is representative of information relating to persons associated with the document. More specifically, the persons associated with the document may include one or more authors of the document and persons mentioned in the document. It will be appreciated that a document may comprise content referring to work of other persons in the domain of the document. Therefore, upon parsing the document, such persons associated with the document are represented as name entities. Notably, name entities may be classified based on classifiers: authored, mentioned. Similarly, an organization entity is representative of information relating to organizations associated with the document. Specifically, an organization may be associated with a document by way of being: a publishing agency or journal of the document, university or company that the author of the document is affiliated to and the like. Moreover, the organization entity identified for a document may include an entity representing location of the organization from where the document originated.

The entity network comprises a plurality of entities and their relationships. Notably, different entities such as document entities, name entities and topic entities have affiliations to each other. Such affiliations are represented by way of relationships in the entity network. It will be appreciated that a person authoring or being mentioned in a document has an affiliation with such document. Therefore, such affiliation of a person with a document is represented as a relationship in the entity network. Similarly, an affiliation of a publishing journal with a document being published thereby is represented as a relationship between organization entity and document entity thereof in the entity network. In another example, an affiliation of a person with an organization providing employment to the person is represented as a relationship.

Optionally, the server arrangement is configured to determine, a relationship score of at least one relationship between a document entity and a name entity, based on classifiers of name entity that include at least one of: authored, mentioned. As mentioned previously, a name entity is representative of information relating to persons associated with the document. Specifically, the persons associated with the document may include one or more authors of the document and persons mentioned in the document. Therefore, a name entity representing a person is classified into one of the classifiers based on whether the person authored the document or was mentioned in the document. Consequently, relationship score of relationships between name entity and the document entity (representing the document) is determined. Herein, the term "relationship score" refers to a representative value assigned to at least one relationship between a document entity and name entity to quantify an importance or relevance of the person (being represented by said name entity) to the document (being represented by said document entity). Such representative value may be quantified using number, alphabets or alphanumeric characters. Specifically, relationship score of a relationship between a given document entity and a name entity, that represents a person who authored the given document is higher than a relationship score of a relationship between the given document entity and a name entity, that represents a person who was mentioned in the given document.

It will be appreciated that an entity network is a way of representing different entities and relationships therebetween in a machine-readable format. Additionally, optionally, such representation may be human-readable. Such representation illustrates the plurality of entities identified from the plurality of documents and establishes relationships between such plurality of entities.

In an embodiment, the entity network is represented as a network graph, wherein the plurality of entities are represented as nodes and the relationships between the plurality of entities are represented as edges between the nodes in the network graph. Specifically, the network graph is a visual representation of the entity network that illustrates the entities as distinct nodes and the relationships between the entities as edges between the nodes. The shape of the nodes may be circular, polygonal and the like. Such visual representation of the entity network is beneficial in conveying key information about the entity network in a clear and concise manner. In an example, the shapes of the nodes may be varied to represent different types of entities. In another example, different types of entities may be represented as differently colored nodes. In yet another example, varying relationship scores of relationships between document entities and name entities may be represented using varying thicknesses of the edges between the nodes. Such visual representation is further beneficial for representing large volumes of data.

Optionally, the entity network is generated by determining one or more latent features relating to the plurality of documents using a generative mathematical model. The server arrangement analyses the plurality of documents stored in the database arrangement and identifies one or more latent features in each of the plurality of documents using the generative mathematical model based on inference and content of the documents. Herein, the term "latent feature" refers to one or more features extracted from a document typically by some algorithm, for example algorithms like Latent Dirichlet allocation (LDA), community algorithms, centrality algorithms, page rank. Examples of latent features include a domain or a subject relating to the content of the document. The latent feature could refer to a specific domain area about which information is provided in a document. In an example, the latent feature for a given document may be 'breast cancer'. It will be appreciated that a given document may have multiple latent features associated therewith. Notably, the multiple latent features may be related to each other, for example, 'cancer', 'breast cancer' and 'lung cancer'. Additionally, or alternatively, the multiple latent features may be unrelated to each other, for example, 'genome analysis' and 'cloud computing'. Therefore, the generative mathematical model is operable to generate a set of latent features based on inference of features from the plurality of documents. Moreover, the latent features are extracted by analyzing metadata relating to the document or by parsing the content of the document. Herein, the term "generative mathematical model" refers to a set of statistical analysis models employing unsupervised learning methods to identify observable patterns and trends in data and to identify information implicitly present in a dataset. Specifically, generative mathematical models allow sets of observations to be explained by unobserved groups that explain why some parts of the data are similar. For example, if observations are words collected into documents, the generative mathematical model provides that each document is a mixture of a small number of latent features and that each word's presence is attributable to one of the latent features of the documents. Examples of generative mathematical models include, but are not limited to, Gaussian mixture model, Naïve Bayes classifier, Hidden Markov model, Boltzmann machines, Latent Dirichlet allocation.

Pursuant to embodiments of the present disclosure, the latent features determined that relate to the plurality of documents are included as the topic entities in the entity network. It will be appreciated that relationships of one or more latent features with a document is represented as relationships between said one or more topic entities with a document entity corresponding to said document in the entity network.

Furthermore, the server arrangement is configured to identify relationships between the topic entities and at least one document entity. Specifically, relationships are identified between the document entities and the topic entities that are identified from those document entities. In an example, from a document represented by document entity 'A', identified topic entities are 'artificial intelligence' and 'DNA sequencing'. Therefore, relationships between the topic entities, 'artificial intelligence' and 'DNA sequencing', and the document entity 'A' are established. Such identification of relationships is performed for every topic entity that is identified in each document from the plurality of documents.

Optionally, the generative mathematical model is a mixed membership stochastic model. The generative mathematical model is configured to determine mixed-membership relationships between at least one document entity and the topic entities. The term "mixed membership relationship" as used herein refers to relationships determined based on characteristic interactions of each entity of the plurality of entities belonging to one or more groups or clusters, wherein each entity of the plurality of entities having different degree or strength of relationships. Optionally, each entity of the plurality of entities assumes a different membership or relationship during interaction with other entities.

Optionally, the generative mathematical model is a Latent Dirichlet allocation. Notably, the Latent Dirichlet allocation allows inferences or observations to be explained by topic entities pertaining to similarities between any two document entities. Specifically, the Latent Dirichlet Allocation is performed based on one or more parameters, such as a Dirichlet prior ($\alpha$) or topic distribution per document, and word distribution per topic ($\beta$). The Dirichlet prior or $\alpha$, represents the measure of generality or specificity of a document. Specifically, if $\alpha$ is too high, it indicates to a highly generic document comprising of a variety or mixture of features. Alternatively, if $\alpha$ is low, it indicates to a more specific document, comprising lower number of topics indicative of the higher fidelity or similarity in the topic distribution. Furthermore, if word distribution per topic or $\beta$ is too high, it indicates that the topics are too generic in lieu of the concerned topics comprising of most of the words and hence a high value of β is indicative of a highly generic document and vice versa.

The server arrangement is configured to determine an importance score of each of the name entities in the entity network by employing one or more centrality algorithms. Herein, the term "importance score" refers to a representative value assigned to each of the name entities in the entity network to quantify an importance or influence of a person (being represented as a name entity) in the entity network. Such representative value may be quantified using number, alphabets or alphanumeric characters. Furthermore, the term "centrality algorithm" as used herein the present disclosure refers to one or more algorithms configured to identify, estimate or understand the role and/or influence and/or importance of each name entity in the entity network. Notably, the centrality of a name entity in the entity network refers to how central and vital an entity is amongst other entities in the entity network. The centrality algorithms enable the analysis of individual entities in any entity network based on a plurality of parameters depending upon the type of centrality algorithm being employed. Some examples of centrality algorithms include degree centrality, closeness centrality, betweenness centrality and so forth. More optionally, one or more centrality algorithms comprises intermittent variations in the algorithms such as a variation of closeness centrality by Wasserman and Faust, Dangalchev, Tran and Kwon and so forth.

Optionally, the centrality algorithms employed to perform the aforementioned task of connecting the disconnected graph are closeness centrality algorithms. Specifically, closeness centrality algorithm is operable to determine the importance of each name entity to provide a preferential candidate amongst the name entities to be assigned as a person entity, wherein the closeness centrality of a name entity is determined based on:

$$CC(u) = \frac{n-1}{N-1} \frac{n-1}{\sum_{v=1}^{n-1} d(u, v)}$$

wherein, u represents a name entity, N represents the total number of entities in the entity network, n is the number of entities in the same component as u in the entity network and d(u,v) represents the shortest path between the pair of entities u and v.

Additionally, optionally, the centrality algorithms include betweenness centrality algorithms. It will be appreciated that an entity network may include multiple document entities representing the same document and therefore, may get over-populated, thereby increasing the computational time and reducing efficiency of the system. Notably, in an embodiment when the entity network is represented as the network graph, the betweenness centrality algorithms quantify the number of times a node acts as a bridge along the shortest path between two other nodes. In an example, such quantification functions as a measure for quantifying the control of a human on the communication between other humans in a social network. Specifically, the betweenness centrality algorithm determines the shortest path between each pair of document entities and consequently, determines the entity that is included in a highest number of the shortest paths. Such entity represents a source document entity that originated the document and is used to de-duplicate document entities, thereby reducing repetition in the entity network.

The server arrangement is configured to determine a relevance score of at least one document entity based on relationships thereof with the name entities and the topic entities, and the importance score of each of the name entities using link analysis algorithm. Herein, the term "relevance score" as used herein the present disclosure relates to a measure of degree of relevance or significance of at least one document entity in the entity network. Notably, assignment of relevance score is done by determining or identifying the number of relationships of the document entity with each name entity, topic entity. Herein, the term "link analysis algorithm" refers to a data analysis technique employed to measure the directional influence of an entity, preferably document entity; based on analysis of the neighboring entities in the entity network. Some examples of link analysis algorithms include HITS (hyperlink-induced topic search), TrustRank and PageRank. Notably, the relevance score of a document entity is determined based on the number of relationships said document entity has with its neighboring name entities, topic entities. Herein, a contribution of the number of relationships towards the relevance score may be weighted based on the type of relationship. In an example, for a relationship between the document entity and name entity, the weightage factor may be 0.5. Similarly, for a relationship between the document entity and topic entity, the weightage factor may be 0.3. Therefore, the number of relationships of a given type may be multiplied by the corresponding weightage factor and the result may be used to determine the relevance score. Additionally, the relevance score of a given document entity is determined based on the importance of each of the name entities that have a relationship with the given document entity. In an example, a document entity having relationships with name entities having high importance scores may have a high relevance score in comparison with another document entity having relationships with name entities having low importance scores. Therefore, link analysis algorithms perform such calculations of importance score.

Optionally, the link analysis algorithm is PageRank. Herein, the page rank algorithm is a link analysis algorithm employed to evaluate the relationships between two or more entities. Such relationships are formed primarily between the document entity with the name entity, and the topic entity. The PageRank algorithm is employed to calculate a PageRank score to determine the relevance score for the at least one document entity. Specifically, the page rank score for a given document entity 'u' is given by:

$$PR(u) = (1-d) + d\left(\frac{PR(T1)}{C(T1)} + \ldots + \frac{PR(Tn)}{C(Tn)}\right)$$

wherein, u represents a document entity having citations from pages T1 to Tn, d represents the damping factor, 1-d represents the damping factor for a document entity with zero outbound links, C(Tn) represents the total number of outbound links. Furthermore, the '1-d' factor is used to mitigate rank sink. The term "rank sink" as used herein the present disclosure refers to a discrepancy caused when a document entity accumulates a higher page rank at each iterative step of Page Rank.

Optionally, the server arrangement is configured to determine at least one affiliation score of the at least one relationship between a given topic entity and a given document entity. Herein, the term "affiliation score" refers to a measure of affiliation or association of a document entity with a topic entity. In other words, the affiliation score is proportional to the strength of the relationship of the document entity with the topic entity. It will be appreciated that a given document (represented by a given document entity in the entity network) may have a relationship with a plurality of latent features, wherein each of the latent features is represented as topic entities having a relationship with the given document entity. Subsequently, the document is analyzed with respect to each of the plurality of latent features to objectively measure a degree of semantic similarities therebetween. In an exemplary implementation, the document is analyzed to determine word distribution therein, and thereafter such word distribution is mapped with words relating to each of the plurality of latent features, to determine a degree of relation of a document with respect to the latent features. Consequently, such degree of relation of the document is employed to calculate the affiliation score. Optionally, the relevance score of a given document entity is determined further based on affiliation score of the given document entity with the topic entities that have a relationship therewith.

The server arrangement is configured to cluster one or more name entity based on the relationships therebetween using clustering coefficients. Notably, clustering coefficients are a measure of degree to which name entities in an entity network tend to cluster together. Specifically, clustering coefficients measure a degree of relationships between a given set of name entities, and consequently, if the clustering coefficient is higher than a threshold, the server arrangement is configured to cluster one or more name entities in the given set of name entities. It will be appreciated that a high degree of inter-relationships between a given set of name entities signifies a high relevance and inter-dependence of such entities. Furthermore, it will be understood that in an entity network generally comprising multiple name entities for a singular person, the name entities having a high degree of inter-relationships therebetween may collectively refer to a given singular person. Therefore, clustering coefficients for various sets of name entities are determined using the server arrangement and for the sets of name entities having clustering coefficients higher than a threshold, such sets of name entities are defined as clusters. It will be appreciated that the value of threshold may be determined iteratively to optimize the value thereof in a manner that (a) any cluster of name entities does not comprise name entities referring to more than a singular person, and (b) any cluster of name entities referring to a given person, does not exclude any name entities that also refer to the given person. Such clustering methods are well known in the art.

In an exemplary implementation, the clustering coefficient for a given name entity 'u' is given by 'C(u)', wherein $$C(u) = \frac{2R_u}{k_u(k_u - 1)}$$

Herein, in the mathematical calculation for 'C(u)', Ru is total number of relationships of entities having a relationship with entity 'u', and ku is the degree of the entity 'u' or specifically, number of relationships of the entity 'u'.

The server arrangement is configured to assign a name entity from each cluster of the one or more name entities as the person entity based on the importance score of each of the name entities. As mentioned previously, the server arrangement is configured to determine importance score of each of the name entities. Thereafter, each of the name entities are clustered based on inter-relationships therebetween. Subsequently, a name entity with the highest importance score in a given cluster is assigned as the person entity for the cluster. It will be appreciated that in entity networks generated using a plurality of documents, multiple name entities may be present for a singular person. Notably, to disambiguate such entity network, determining which name entities represent a single person is crucial. Therefore, clustering one or more name entities and assigning person entities for each of the clusters disambiguates such entity network and provides entity disambiguation.

Optionally, the server arrangement is configured to employ label propagation for assigning name entity as the person entity from the clusters of the one or more name entities that were unassigned based on the importance scores. Notably, label propagation is employed to cluster the name entities that are not clustered using clustering coefficients and assigning person entities for such clusters. Herein, label propagation refers to a semi-supervised machine learning algorithm that assigns new labels (herein, assigning as person entities) to unlabeled data points using data points that are previously labelled (herein, assigned person entities). Specifically, label propagation assigns human entities by propagating the labels based on the connectivity of the names entities discovered or declared in the documents. Additionally, label propagation is employed to identify groups of name entities as they related to two different person entities through a similarity in the topic entity of two different document entities. Such label propagation may be performed by assigning a common name entity having a relationship with two different document entities, to two person entities having a relationship with the same topic entity.

Optionally, the server arrangement is configured to identify relationships between two or more organization entities and hierarchies between organization entities using the modularity optimization algorithms. It will be appreciated that the organization entities in the entity network may be related to each other by way of: being affiliated to each other, being participants in a joint venture, having a parent and subsidiary relationship, having the same parent organization and the like. Such relationships may play a crucial role in entity disambiguation. It forms an indirect relationship between two name entities which are related to two different organizations that have relationship therebetween. Notably, the modularity optimization algorithm may be Louvain modularity. The Louvain modularity algorithms may employ affiliation scores of relationships between the topic entities and the document entities, and relationship scores of relationships between the name entities and the document entities. Such scores attributed to relationships are used for calculation of Modularity M, wherein $$M = \frac{1}{2m} \sum \left[ A_{ij} - \frac{k_i k_j}{2m} \right] \delta(c_i, c_j)$$

wherein $A_{ij}$ is score of relationship between entities i and j, $k_i$ is sum of scores of relationships related to entity i, $k_j$ is sum of scores of relationships related to entity j, m is sum of all the relationships in the entity network, $c_i$ and $c_j$ are community of entities, wherein δ=1 if i=j is set to zero. Herein after, Louvain maximization algorithm is employed to calculate a change in the value of modularity by varying communities of a given entity. Such maximization of the Louvain Modularity is performed for each entity in the network graph to obtain new relationships between organization entities. Optionally, such maximizations may be performed iteratively to optimize the entity network.

The server arrangement is configured to employ contextual information determined for the entity network to be used in a mathematical model for entity disambiguation. Herein, the term "contextual information" refers to information determined for the construction and population of the entity network. Specifically, such information relates to the plurality of entities, the relationships therebetween, latent features and relationships thereof with document entities, importance scores of name entities, relevance score of the document entities, clusters of one or more name entities, and person entities assigned for the clusters of one or more name entities. Optionally, the contextual information may further comprise relationship scores of relationships between document entities and name entities, and affiliation scores of relationships between the topic entities and document entities. It will be appreciated that such contextual information provides significant information relating to name entities, relationships between the name entities. Furthermore, clustering name entities and assigning one of the name entities as a person entity provides insights into the name entities that refer to a given singular person that is assigned as the person entity. Such contextual information is employed by the mathematical model to perform entity disambiguation for a plurality of names relating to persons in the plurality of documents. Notably, such mathematical model may extract embeddings relating to the plurality of entities and relationships therebetween from the entity network.

Optionally, the mathematical model for entity disambiguation employs machine learning algorithms. Typically, examples of the different types of machine learning algorithms, depending upon the training dataset employed for extracting and using contextual information from the entity network comprise, but are not limited to: supervised machine learning algorithms, unsupervised machine learning algorithms, semi-supervised learning algorithms, and reinforcement machine learning algorithms. Specifically, supervised machine learning algorithms include labelled training datasets obtained from the database arrangement. In an embodiment, the mathematical model may be trained using labelled dataset from a deep neural network. Optionally, unsupervised machine learning algorithms refers to a learning technique employed by the machine learning algorithms to employ the mathematical model using unlabeled training dataset or unstructured training information. Such machine learning algorithms employing different types of training approaches may be used to train, structure and employ the mathematical model.

DETAILED DESCRIPTION OF THE DRAWINGS

Referring to FIG. 1, there is shown a network environment 100 in which a system for entity disambiguation is implemented, in accordance with an embodiment of the present disclosure. The system comprises a server arrangement 102 communicably coupled to a database arrangement 104 comprising a plurality of documents. The server arrangement 102 is configured to:
generate an entity network by parsing the plurality of documents, wherein the entity network comprises a plurality of entities and their relationships, the plurality of entities comprising at least: document entities, name entities and topic entities, wherein the entity network is generated by:
determining latent features relating to the plurality of documents and identifying relationships between the latent features and at least one document entity;
determine an importance score of each of the name entities using centrality algorithms;
determine a relevance score of at least one document entity based on relationships thereof with the name entities and the topic entities, and the importance score of each of the name entities using link analysis algorithms;
cluster one or more name entities based on the relationships therebetween using clustering coefficients;
assign a name entity from each of the clusters of one or more name entities as the person entity based on the importance scores of each of the name entities; and
employ contextual information determined for the entity network to be used in a mathematical model for entity disambiguation.

Figure 2:
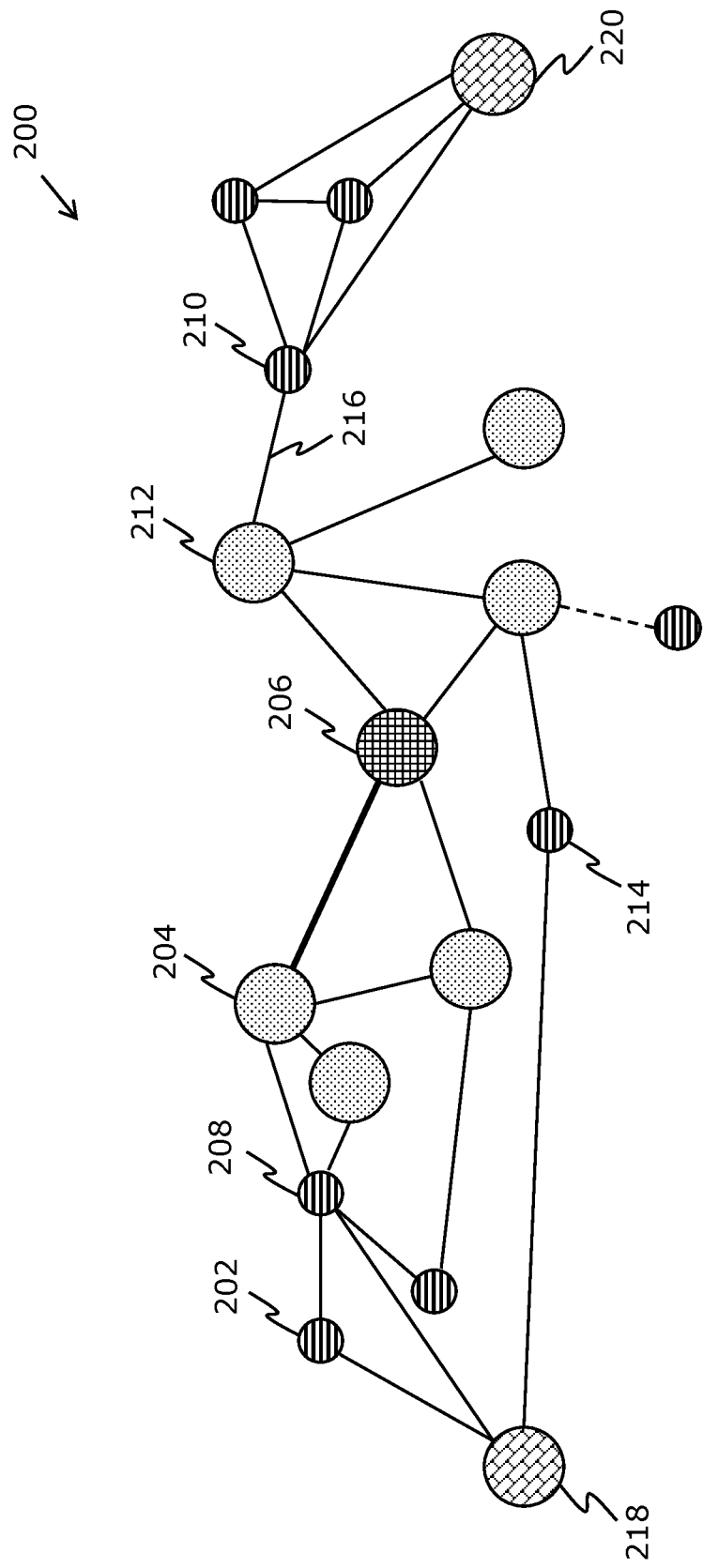
FIG. 2 is an illustration of an entity network represented as a network graph, in accordance with an embodiment of the present disclosure.

Referring to FIG. 2, there is shown an illustration of an entity network represented as a network graph 200, in accordance with an embodiment of the present disclosure. The network graph 200 illustrates a plurality of entities as a plurality of nodes, such as the nodes 202, 204, 208. Herein nodes, such as the nodes 202, 208, 210, represent name entities. Similarly, nodes, such as nodes 204 and 212, represent document entities. Furthermore, the network graph 200 includes topic entities represented using nodes such as a node 206. As shown, the relationships between the plurality of entities are represented as edges between the nodes, such as the edge 216 representing a relationship between a document entity, represented by node 212, and a name entity represented by node 210. Furthermore, different types of relationships between a document entity and a name entity, specifically authored relationships and mentioned relationships, are represented using a solid line and a dotted line respectively. Moreover, the network graph 200 illustrates person entity using nodes such as nodes 218 and 220, wherein node 218 represents the person entity assigned to the cluster of name entities represented by nodes 202, 208 and 214. The network graph 200 further illustrates varying affiliation scores of relationships between document entities and topic entities using different weights of edges representing such relationships. It will be appreciated that varying importance score of name entities and varying relevance scores of document entities are illustrated in the network graph 200 by illustrating nodes of varying radii.

Figure 3:
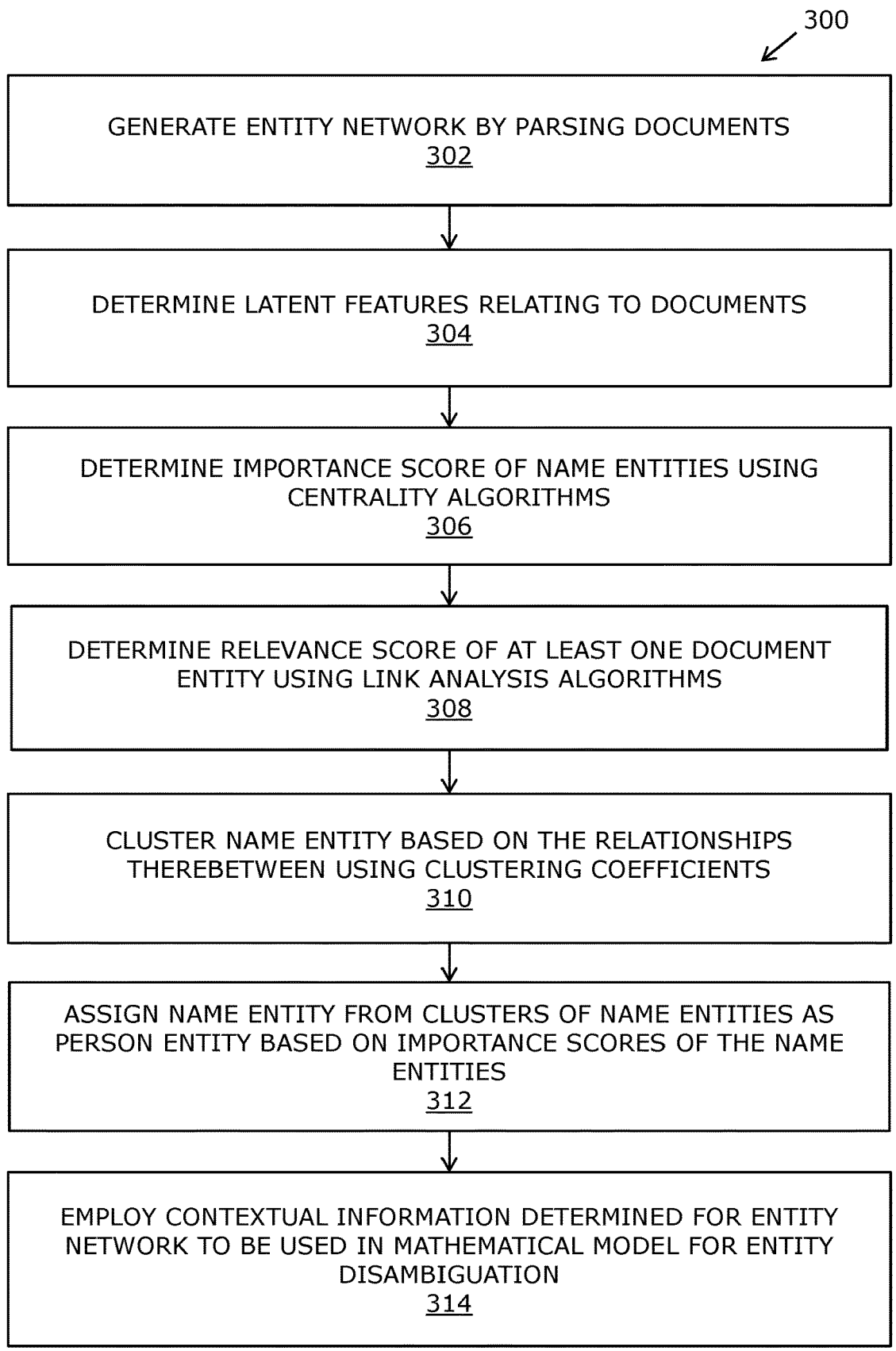
FIG. 3 is an illustration of steps of a method for entity disambiguation, in accordance with an embodiment of the present disclosure.

Referring to FIG. 3, there is shown an illustration of steps of a method 300 for entity disambiguation, in accordance with an embodiment of the present disclosure. The method is depicted as a collection of steps in a logical flow diagram, which represents a sequence of steps that can be implemented in hardware, software, or a combination thereof, for example as aforementioned. The method 300 is implemented using a system comprising a server arrangement communicably coupled to a database arrangement, wherein the database arrangement comprises a plurality of documents. At a step 302, an entity network is generated by parsing the plurality of documents. At a step 304, latent features relating to the plurality of documents are determined using a generative mathematical model. At a step 306, importance score of each of the name entities is determined using centrality algorithms. At step 308, a relevance score of at least one document entity is determined based on relationships thereof with name entities and the topic entities, and the importance scores of each of the name entities using link analysis algorithms. At a step 310, one or more name entities are clustered abased on the relationships therebetween using clustering coefficients. At a step 312, a name entity from each of the clusters of one or more name entities is assigned as the person entity based on the importance scores of each of the name entities. At a step 314, contextual information determined for the entity network is employed to be used in a mathematical model for entity disambiguation.

The steps 302 to 314 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for entity disambiguation, the system comprising a server arrangement communicably coupled to a database arrangement comprising a plurality of documents, wherein the server arrangement is configured to:
    generate an entity network by parsing the plurality of documents, wherein the entity network comprises a plurality of entities and their relationships, the plurality of entities comprising at least: document entities, name entities and topic entities, wherein the entity network is generated by:
        determining latent features relating to the plurality of documents and identifying relationships between the latent features and at least one document entity;
    determine an importance score of each of the name entities using centrality algorithms;
    determine a relevance score of at least one document entity based on relationships thereof with the name entities and the topic entities, and the importance score of each of the name entities using link analysis algorithms;
    cluster one or more name entities based on the relationships therebetween using clustering coefficients;
    assign a name entity from each cluster of the one or more name entities as the person entity based on the importance score of each of the name entities; and
    employ contextual information determined for the entity network to be used in a mathematical model for entity disambiguation.

2. The system of claim 1, wherein the server arrangement is configured to determine a relationship score of at least one relationship between a document entity and a name entity, based on classifiers of the name entity that include at least one of: authored, mentioned.

3. The system of claim 1, wherein the server arrangement is configured to employ label propagation for assigning a name entity as the person entity from the clusters of the one or more name entities that were unassigned based on the importance scores.

4. The system of claim 1, wherein the server arrangement is configured to determine at least one affiliation score of the at least one relationship between a given topic entity and a given document entity.

5. The system of claim 4, wherein the server arrangement is configured to identify relationships between two or more organization entities and hierarchies between organization entities using the modularity optimization algorithms.

6. The system of claim 1, wherein the entity network is represented as a network graph, wherein the plurality of entities are represented as nodes and the relationships between the plurality of entities are represented as edges between the nodes in the network graph.

7. The system of claim 1, wherein the mathematical model for entity disambiguation employs machine learning algorithms.

8. The system of claim 1, wherein the generative mathematical model is Latent Dirichlet allocation.

9. The system of claim 1, wherein the link analysis algorithm is Page Rank.

10. A method for entity disambiguation, wherein the method is implemented using a system comprising a server arrangement communicably coupled to a database arrangement, wherein the database arrangement comprises a plurality of documents, wherein the method comprises:
    generating an entity network by parsing the plurality of documents, wherein the entity network comprises a plurality of entities and their relationships, the plurality of entities comprising at least: document entities, name entities and topic entities, wherein the entity network is generated by:
        determining latent features relating to the plurality of documents and identifying relationships between the latent features and at least one document entity;
    determining an importance score of each of the name entities using centrality algorithms;
    determining a relevance score of at least one document entity based on relationships thereof with the name entities and the topic entities, and the importance score of each of the name entities using link analysis algorithms;
    clustering one or more name entities based on the relationships therebetween using clustering coefficients;
    assigning a name entity from each cluster of the one or more name entities as the person entity based on the importance score of each of the name entities; and
    employing contextual information determined for the entity network to be used in a mathematical model for entity disambiguation.

11. The method of claim 10, wherein the method comprises determining a relationship score of at least one relationship between a document entity and a name entity, based on classifiers of the name entity that include at least one of: authored, mentioned.

12. The method of claim 10, wherein the method comprises employing label propagation for assigning a name entity as the person entity from the clusters of one or more name entities that were unassigned based on importance scores.

13. The method of claim 10, wherein the method comprises determining at least one affiliation score of the at least one relationship between a given topic entity and a given document entity.

14. The method of claim 13, wherein the method comprises identifying relationships between two or more organization entities and hierarchies between organization entities using the modularity optimization algorithms.

15. The method of claim 10, wherein the method comprises representing the entity network as a network graph, wherein the plurality of entities are represented as nodes and the relationships between the plurality of entities are represented as edges between the nodes in the network graph.

* * * * *